(12) United States Patent
Qian et al.

(10) Patent No.: US 8,184,731 B2
(45) Date of Patent: May 22, 2012

(54) FEEDBACK ADJUSTABLE CONSTELLATION DE-MAPPER

(75) Inventors: Dayou Qian, Plainsboro, NJ (US); Jianjun Yu, Princeton, NJ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 664 days.

(21) Appl. No.: 12/372,378

(22) Filed: Feb. 17, 2009

(65) Prior Publication Data
US 2010/0208853 A1    Aug. 19, 2010

(51) Int. Cl.
*H04L 5/12* (2006.01)
(52) U.S. Cl. ............................................ 375/261
(58) Field of Classification Search ............ 375/226, 375/227, 261, 340
See application file for complete search history.

(56) References Cited

U.S. PATENT DOCUMENTS

| | | | |
|---|---|---|---|
| 7,826,521 B1* | 11/2010 | Sun et al. | 375/225 |
| 2002/0064233 A1* | 5/2002 | Terreault et al. | 375/261 |
| 2006/0146924 A1* | 7/2006 | Smith et al. | 375/226 |
| 2009/0129257 A1* | 5/2009 | Maltsev et al. | 370/208 |
| 2010/0040171 A1* | 2/2010 | Qu et al. | 375/298 |

* cited by examiner

*Primary Examiner* — Don N Vo
(74) *Attorney, Agent, or Firm* — James Bitetto; Joseph Kolodka

(57) ABSTRACT

A system and method to adjust the symbol constellation used to de-map a signal in an optical coherent communications system. A feedback de-mapper adjustment module is configured to compare average Error Vector Magnitude and Bit Error Ratio to a pre-defined table to determine when a constellation de-mapper mismatch occurs. The feedback de-mapper adjustment module then rotates the de-mapper constellation in order to compensate for phase drift.

18 Claims, 3 Drawing Sheets

FEEDBACK ADJUSTABLE CONSTELLATION DE-MAPPER

BACKGROUND

1. Technical Field

The present invention relates to optical coherent communications systems, and more particularly to a system and a method for adjusting a constellation de-mapper in response to error feedback.

2. Description of the Related Art

In optical coherent communications systems using Pulse Amplitude Modulation (PAM), Quadrature Amplitude Modulation (QAM) or may Phase Shift Keying (m-PSK), a received signal may be corrupted by a carrier frequency-offset (CFO) due to local oscillator drift. Since a CFO causes a time-varying rotation of the received data symbols, it has to be accurately estimated and compensated for prior to symbol detection at the receiver, particularly in the case of large-size symbol constellations.

Non-data-aided (or blind) techniques for extracting symbols from a signal have been proposed in order to preserve bandwidth efficiency and simplify the transmitter architecture. A standard approach to joint blind equalization and carrier recovery consists of first performing equalization using the constant modulus algorithm (CMA), and then estimating the carrier phase and frequency from the equalized output. For m-PSK or QAM systems, frequency offset and carrier phase can be recovered using the fourth-power of the equalizer output.

In order to extract symbols from a modulated signal, a constellation de-mapper, such as the differential 8-PSK constellation de-mapper shown in FIG. 1, is used. The input 12 is the received complex signal sequence, after frequency offset and phase offset have been removed. The phases of two successive inputs 14 and 16 are compared 18 and then passed through the Phase Shift Keying threshold 20, which places the input on the constellation. The constellation de-mapper 22 produces as output 24 the binary data (bit) stream. Obviously, the constellation de-mapper has to correspond to the PAM/QAM/m-PSK signal generation processing at the transmitter to guarantee the output bits' correctness. The de-mapper is usually designed after the transmitter generates the m-PSK signal through back-to-back calibration. However, due to the limits of the blind CFO estimation algorithm, the de-mapper could change when the CFO exceeds a certain threshold. When the constellation de-mapper changes, the binary data (bits) output cannot maintain correctness. When this occurs, the CFO has caused the symbols to shift, resulting in a de-mapper mismatch.

SUMMARY

An apparatus and method for de-mapping the symbols of a received signal encoded according to a rotational constellation. A constellation de-mapper is configured to de-map a received signal according to a rotationally symmetric constellation of symbols. A feedback de-mapper adjustment module is configured to adjust the constellation of symbols to accommodate a rotation in the received signal based on feedback from an average error vector magnitude (EVM) estimator and a bit error ratio (BER) monitoring module. The feedback de-mapper adjustment module compares the average EVM and the BER to a predefined table and, if a mismatch is detected, the feedback de-mapper adjustment module rotates the constellation de-mapper to compensate.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In order to address the problem of Carrier Frequency Offset (CFO) causing a de-mapper mismatch, it would be advantageous to have a blind means for adjusting the de-mapper based on error feedback, allowing a receiver to correctly interpret a signal despite high CFO.

Figure 1:
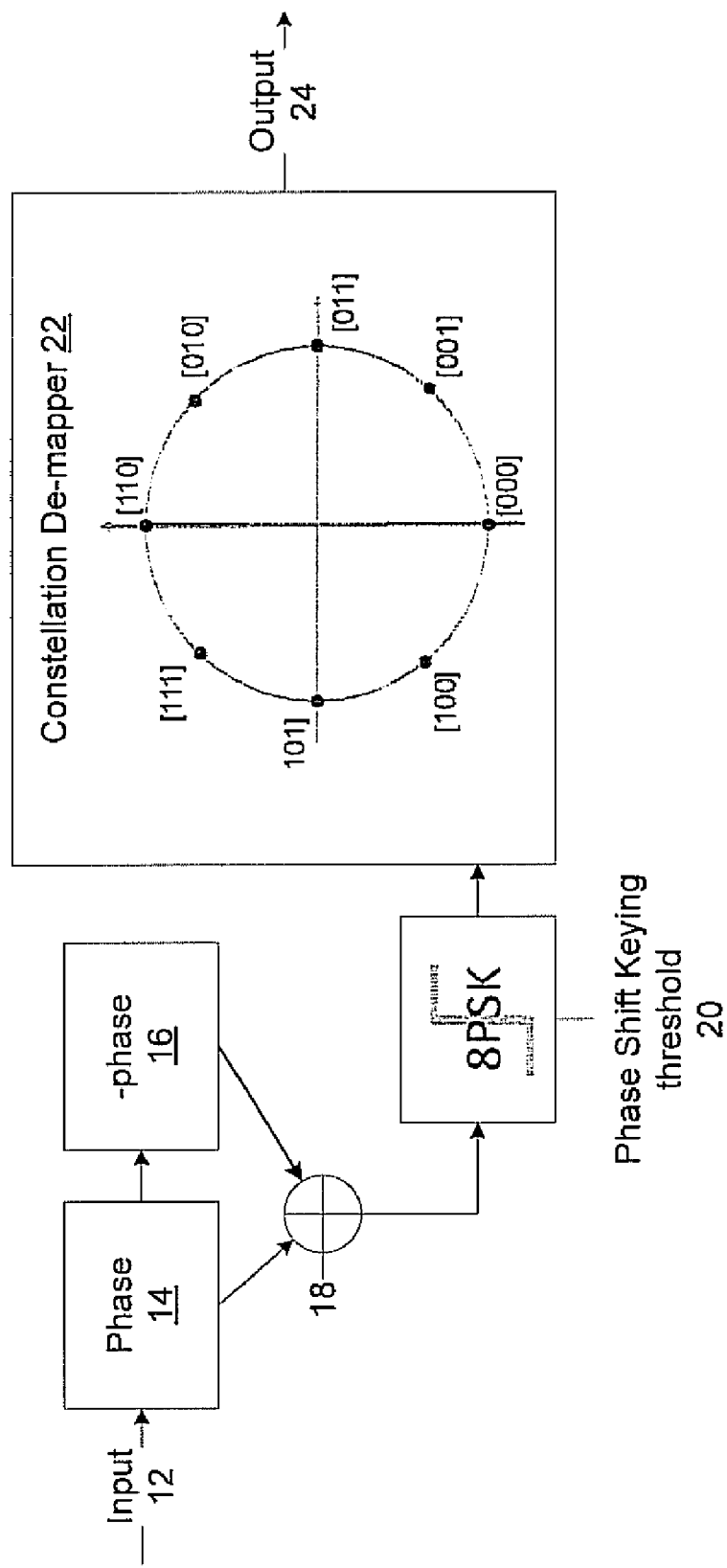
FIG. 1 is a block diagram showing a prior art system for de-mapping a differential 8-PSK constellation.
Figure 2:
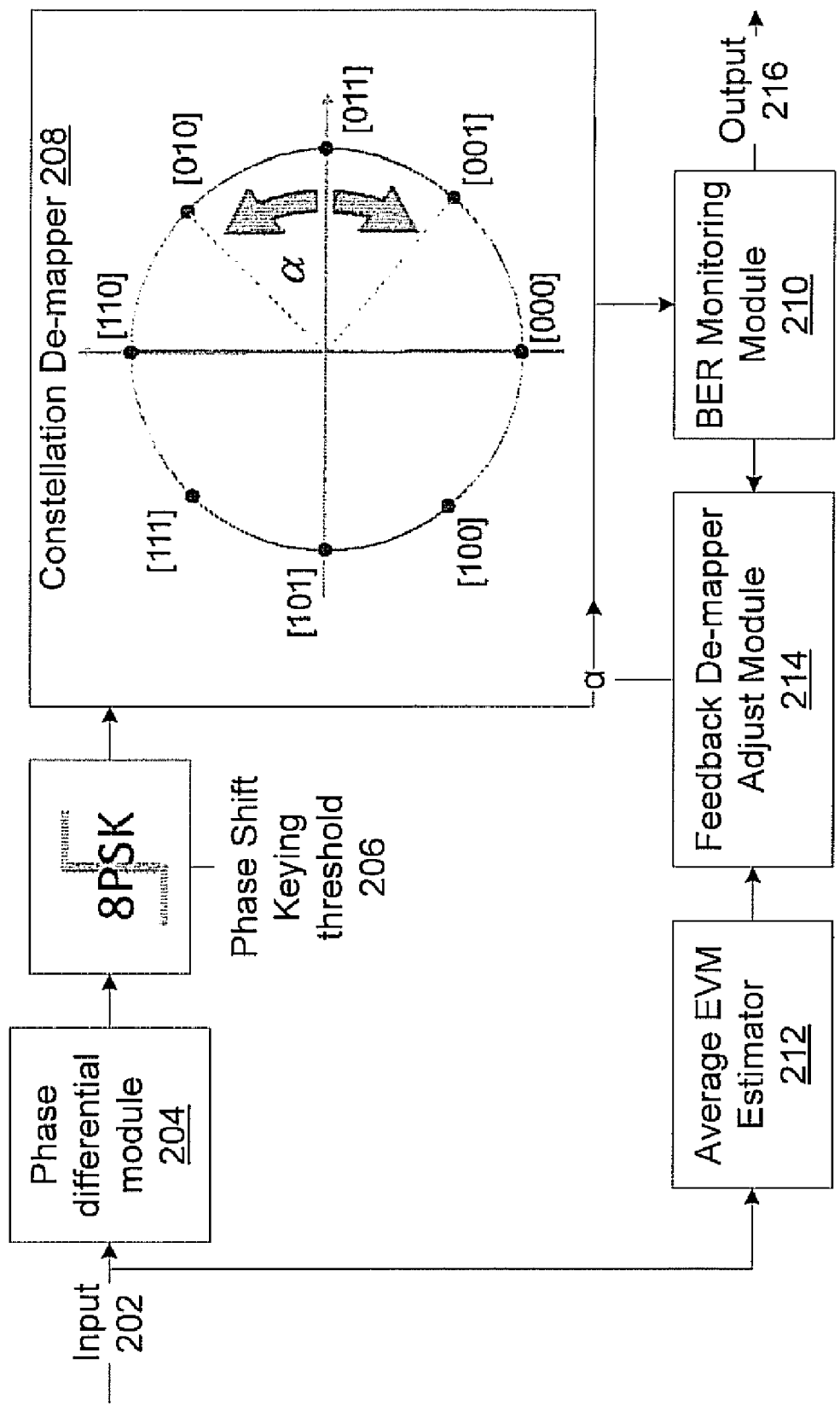
FIG. 2 is a block diagram showing a system for de-mapping the constellation of symbols of a received signal, which is able to adapt to rotation of the constellation.

Referring now in detail to the figures in which like numerals represent the same or similar elements and initially to FIG. 2, an exemplary system is shown which adjusts a constellation de-mapper for a differential 8-PSK signal. An input 202 passes through a phase differential module 204, which measures a phase difference between successive signals. The phase difference output then passes through a phase shift keying threshold 206, which places the signal on the constellation. A constellation de-mapper 208 decodes the signal's symbol and converts the symbol to binary data. The de-mapper's output passes through Bit Error Ratio (BER) monitor 210 before leaving the system at 216. The BER monitor 210 passes a BER measurement $\xi$ to a feedback de-mapper adjustment module 214.

The input 202 is also passed to an average error vector magnitude (EVM) estimator 212, which keeps a running average of the magnitude of the difference between the received vector and an ideal vector. This average EVM p is passed on to the feedback de-mapper adjustment module 214.

The feedback de-mapper adjustment module 214 compares the BER measurement $\xi$ and the average EVM p to a pre-defined table. This allows the feedback de-mapper adjustment module 214 to detect abnormal BER performance degradation due to a constellation de-mapper mismatch. When the Carrier Frequency Offset has caused the signal to rotate by a full symbol, the BER will suddenly increase, while the average EVM will be unaffected by the mismatch. Thus, when the BER diverges significantly from the value that would be expected based on the EVM and the pre-defined table, the feedback de-mapper adjustment module 214 causes the de-mapper to rotate.

Embodiments described herein may be entirely hardware, entirely software or including both hardware and software elements. In a preferred embodiment, the present invention is implemented in software, which includes but is not limited to firmware, resident software, microcode, etc., and controls a constellation de-mapper of an optical receiver.

Embodiments may include a computer program product accessible from a computer-usable or computer-readable medium providing program code for use by or in connection with a computer or any instruction execution system. A computer-usable or computer readable medium may include any apparatus that stores, communicates, or transports the program for use by or in connection with the instruction execution system, apparatus, or device. The medium can be magnetic, optical, electronic, electromagnetic, infrared, or semiconductor system (or apparatus or device). The medium may include a computer-readable medium such as a semiconductor or solid state memory, magnetic tape, a removable computer diskette, a random access memory (RAM), a read-only memory (ROM), a rigid magnetic disk and an optical disk, etc.

Figure 3:
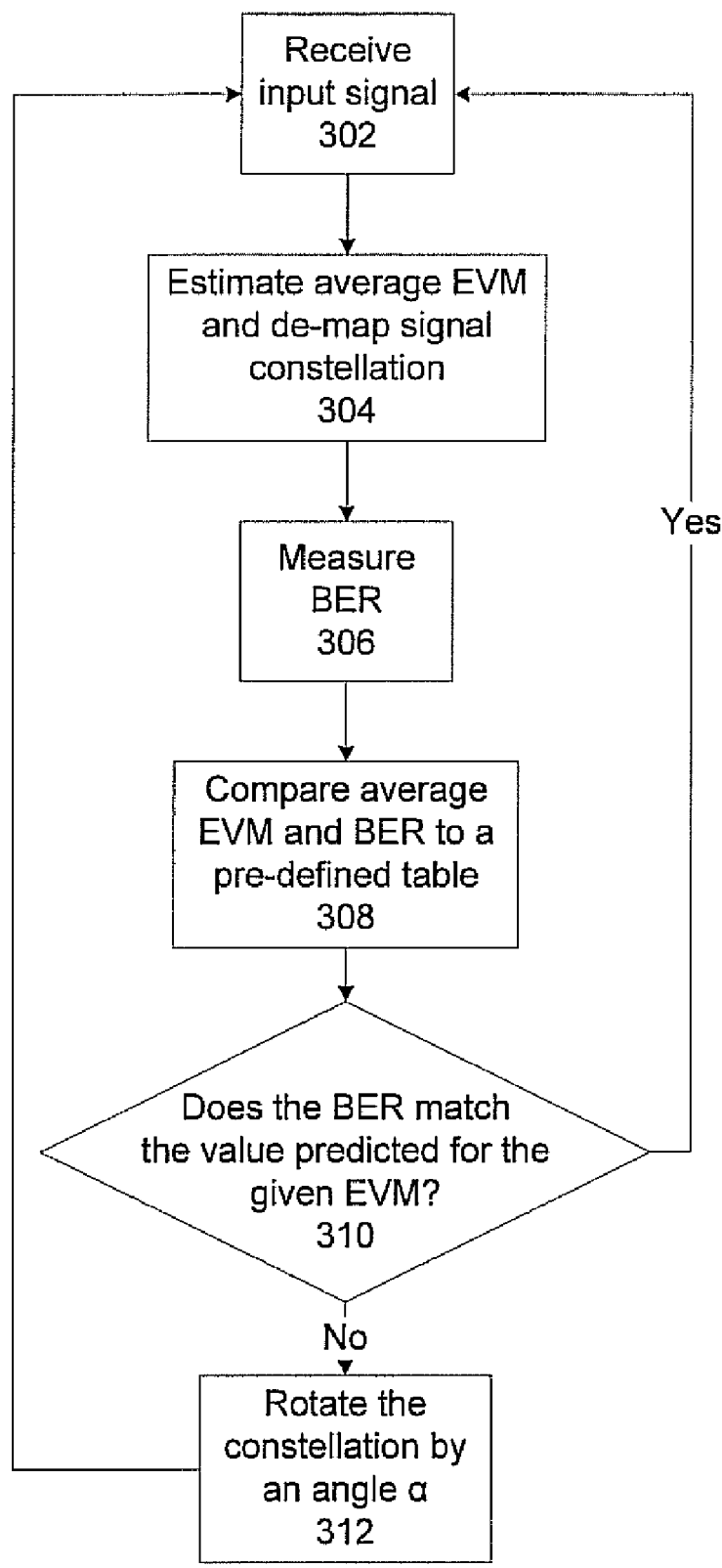
FIG. 3 is a block diagram showing a method for adjusting a constellation de-mapper.

Referring now to FIG. 3, a non-data-aided (i.e., blind) process by which a system may adjust its constellation de-mapper based on feedback is provided.

An input signal is received at block 302. That signal is then used to estimate an average EVM and to obtain the symbol encoded in it at block 304. The BER of the output symbols is measured at block 306. The average EVM and the BER are compared to a pre-defined table at block 308. The process then calls for a determination of whether the BER is in accord with the BER values predicted by the table for the given average EVM at block 310. If the BER is in the expected range, the process returns to step 302 for the next input. If the BER is significantly outside the expected range, at block 312 the constellation is rotated, clockwise or counterclockwise, by an angle of α, where α=(2 n/m), and m is the size of the constellation; in the example of FIG. 2, m=8. Other formulae for the angle α, such as n/m, may be used, depending on the speed with which the CFO rotates through the constellation's symbols. After the constellation has been rotated, the method returns to block 302 and the next input is processed.

This method takes advantage of the m-way rotational symmetry of the constellation and tracks the CFO as it causes the input to rotate through the constellation's symbols. Therefore the process will work in any coding scheme possessing such a rotationally symmetric constellation, such as QAM, PAM, and any m-ary PSK.

The process of FIG. 3 is also made possible by the fact that the average EVM and the BER are usually correlated with each other. The EVM determines the magnitude of the difference between a received signal and an ideal signal; as the received signal rotates due to CFO, the EVM does not make large jumps in magnitude, and so remains relatively stable. In contrast, the BER is judged by the correctness of the output of the constellation de-mapper (as determined by FEC or some higher-layer function). When the received signal drifts across the boundary between symbols, the BER will quickly jump from the very low rate required, for example, in telecommunications (0.003) to a very high rate (0.5), representing the boundary between two different symbols. Thus, when the signal drifts across the boundary between symbols, the BER will jump to a value substantially larger than the rate predicted by the table, indicating a constellation mismatch. Based on this, the feedback de-mapper adjustment module can make its determination as to whether to rotate the de-mapper.

As noted above, the present principles apply to de-mapping signals encoded by any means involving a rotationally symmetric constellation of symbols. Specifically contemplated are the encoding methods PAM, QAM, and m-PSK, both differential and non-differential, but these are meant solely to be exemplary, not limiting.

Having described preferred embodiments of a system and method for adjusting a constellation de-mapper based on feedback (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system for de-mapping symbols in a signal, comprising:
    a constellation de-mapper configured to de-map a received signal according to a rotationally symmetric constellation of symbols;
    a feedback de-mapper adjustment module configured to adjust the constellation of symbols; and
    at least two error detection modules;
    wherein the feedback de-mapper adjustment module adjusts the constellation of symbols to accommodate a rotation in the received signal based on error feedback from the at least two error detection modules for an average error and a bit error ratio, and wherein the constellation of symbols comprises m symbols, and the de-mapper is rotated by an angle of $2*\pi/m$, where m is an integer.

2. The system of claim 1, wherein the error detection modules comprise:
    an average error vector magnitude (EVM) estimator; and a bit error ratio (BER) monitoring module.

3. The system of claim 2, wherein the feedback de-mapper adjustment module further comprises a pre-defined table containing expected correspondences between EVM and BER.

4. The system of claim 3, wherein the feedback de-mapper adjustment module further comprises a constellation de-mapper rotator responsive to the detection of a constellation mismatch.

5. The system of claim 2, comprising rotating a constellation by an angle if the BER is outside a predetermined range.

6. The system of claim 2, wherein the BER monitoring module determines the BER using forward error correction.

7. A system for de-mapping symbols in a signal, comprising:
    a constellation de-mapper configured to de-map a received signal according to a rotationally symmetric constellation of symbols;
    a feedback de-mapper adjustment module configured to adjust the constellation of symbols;
    an average error vector magnitude (EVM) estimator; and
    a bit error ratio (BER) monitoring module, wherein the feedback de-mapper adjustment module adjusts the constellation of symbols to accommodate a rotation in the received signal based on error feedback and expected correspondences from the EVM estimator and the BER monitoring module, wherein the constellation of symbols comprises m symbols, and the de-mapper is rotated by an angle of $2*\pi/m$, wherein m is a constellation size.

8. The system of claim 7, wherein the feedback de-mapper adjustment module further comprises a pre-defined table containing expected correspondences between EVM and BER.

9. The system of claim 8, wherein the feedback de-mapper adjustment module further comprises a constellation de-mapper rotator responsive to the detection of a constellation mismatch.

10. The system of claim 7, comprising rotating a constellation by an angle if the BER is outside a predetermined range.

11. The system of claim 7, wherein the BER monitoring module determines the BER using forward error correction.

12. A method for de-mapping the symbols of a signal comprising:
   de-mapping a received signal according to a rotationally symmetric constellation of symbols; and
   comparing the output of at least two error detection modules;
   adjusting the constellation of symbols to accommodate a rotation in the received signal responsive to said comparing of the at least two error detection modules for an average error and a bit error ratio, wherein the constellation comprises m symbols, and the constellation is rotated by an angle of $2*\pi/m$, wherein m is a constellation size.

13. The method of claim 12, further comprising:
   estimating an average error vector magnitude (EVM);
   monitoring the bit error rate (BER) of the de-mapped symbols; and
   comparing the average EVM and the BER to detect a constellation mismatch.

14. The method of claim 13, wherein the step of comparing further comprises comparing the average EVM and BER to a pre-defined table containing expected correspondences between EVM and BER.

15. The method of claim 14, further comprising: rotating the constellation of symbols responsive to the detection of a constellation mismatch.

16. The system of claim 13, comprising rotating a constellation by an angle if the BER is outside a predetermined range.

17. The method of claim 13, wherein the BER is determined using forward error correction.

18. A computer readable medium comprising a computer readable program, wherein the computer readable program when executed on a computer causes the computer to execute the steps of claim 12.

* * * * *